United States Patent
Li et al.

(10) Patent No.: US 7,613,916 B2
(45) Date of Patent: Nov. 3, 2009

(54) METHOD FOR BURNING CHIPS

(75) Inventors: Tao Li, Shenzhen (CN); Chun-Yang Wu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 560 days.

(21) Appl. No.: 11/306,524

(22) Filed: Dec. 30, 2005

(65) Prior Publication Data

US 2007/0040563 A1    Feb. 22, 2007

(30) Foreign Application Priority Data

Aug. 19, 2005    (CN)    ............. 2005 1 0036754

(51) Int. Cl.
*G06F 15/177*    (2006.01)
(52) U.S. Cl. ................ 713/2; 714/36; 324/765
(58) Field of Classification Search .......... 713/1, 713/2; 714/36; 717/175; 324/765
See application file for complete search history.

(56) References Cited

U.S. PATENT DOCUMENTS

| | | | |
|---|---|---|---|
| 6,282,643 B1 * | 8/2001 | Cromer et al. | 713/2 |
| 6,622,245 B1 * | 9/2003 | Nelson | 713/2 |
| 7,100,088 B2 * | 8/2006 | Kuo | 714/36 |
| 2004/0128395 A1 * | 7/2004 | Miyazaki | 709/229 |
| 2005/0141296 A1 | 6/2005 | Zhang | |

* cited by examiner

*Primary Examiner*—Thuan N Du
(74) *Attorney, Agent, or Firm*—Wei Te Chung

(57) ABSTRACT

A method for burning a BIOS chip (108) and a network card chip (107) that are attached on a motherboard (106), includes the steps of: storing a plurality of MAC addresses in a burning device (102); loading a BIOS file and a network card file into the burning device; sending the BIOS file from the burning device to a burning card (104), and burning the BIOS file into the BIOS chip via the burning card; the burning device sending the network card file which includes a MAC address from the burning device to the burning card, and burning the network card file into the network card chip via the burning card; and verifying whether the BIOS chip and the network card chip have been burned correctly.

6 Claims, 4 Drawing Sheets

METHOD FOR BURNING CHIPS

FIELD OF THE INVENTION

Relevant subject matter is disclosed in a co-pending U.S. patent application (application Ser. No. 11/306,525; Pub. No. 2007/0171150; filed on Dec 30, 2005and entitled "BURNING APPARATUS", and another co-pending U.S. patent application (application Ser. No. 11/308,951; Pub. No. 2007/0145993; filed on May 29, 2006 and entitled "CHIP BURNING SYSTEM", which are assigned to the same assignee as this patent application.

The present invention relates to a method for burning chips, and more particularly to a method for burning chips on a motherboard.

DESCRIPTION OF RELATED ART

Generally, motherboards have a plurality of chips for different functions, such as BIOS (Basic Input Output System) chips, network card chips, and so on.

Conventionally, the chips are burned before being attached to the motherboard. A typical chip-burning device includes a buffer, a micro processing unit, a burning unit, and a communication circuit. After the chip is burned by the chip-burning device, the chip is attached to the motherboard. However, pins of the chip are easily damaged during attachment to the motherboard due to misalignment of the pins to corresponding through holes of the motherboard.

Another method of burning chips is to burn the chip after it is attached to the motherboard. A motherboard test machine that has a burning function is used to burn the chip during testing of the motherboard. However, this burning method will cost the testing time. Moreover, the test machine doesn't have the function of verifying whether the chip was burned correctly.

What is needed, therefore, is a more efficient method for burning chips.

SUMMARY OF INVENTION

A method for burning a BIOS chip and a network card chip that are attached on a motherboard, includes the steps of: storing a plurality of MAC addresses in a burning device; loading a BIOS file and a network card file into the burning device; sending the BIOS file from the burning device to a burning card, and burning the BIOS file into the BIOS chip via the burning card; sending the network card file which includes a MAC address from the burning device to the burning card, burning the network card file into the network card chip via the burning card; and verifying whether the BIOS chip and the network card chip have been burned correctly.

Other advantages and novel features will be drawn from the following detailed description of a preferred embodiment with attached drawings, in which:

DETAILED DESCRIPTION

Figure 1:
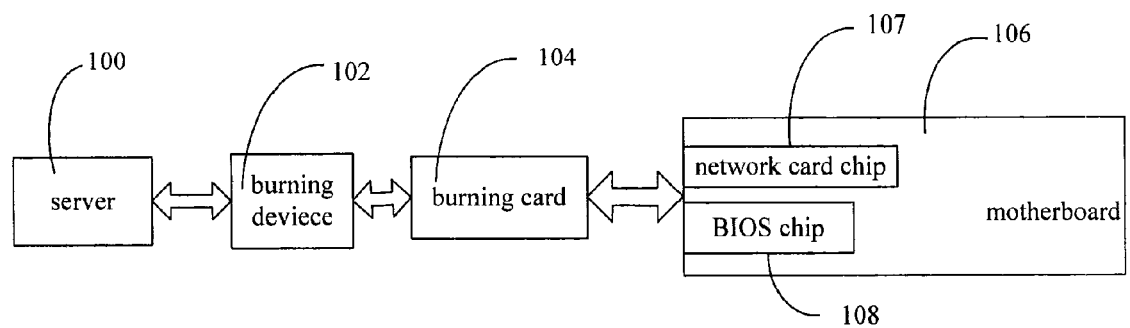
FIG. 1 is a block diagram of an exemplary system used in implementing the method of burning chips in accordance with a preferred embodiment of the present invention.

Referring to FIG. 1, a chip burning system for implementing a method of burning chips in accordance with a preferred embodiment of the present invention includes a server 100, a burning device 102, a burning card 104, and a motherboard 106. The motherboard 106 has a network card chip 107 and a BIOS chip 108 attached thereon. The server 100 is coupled to the burning device 102, and records the burn result that is sent from the burning device 102. The burning card 104 is coupled to the burning device 102, and controlled by the burning device 102 to burn the network card chip 107 and the BIOS chip 108.

Figure 2:
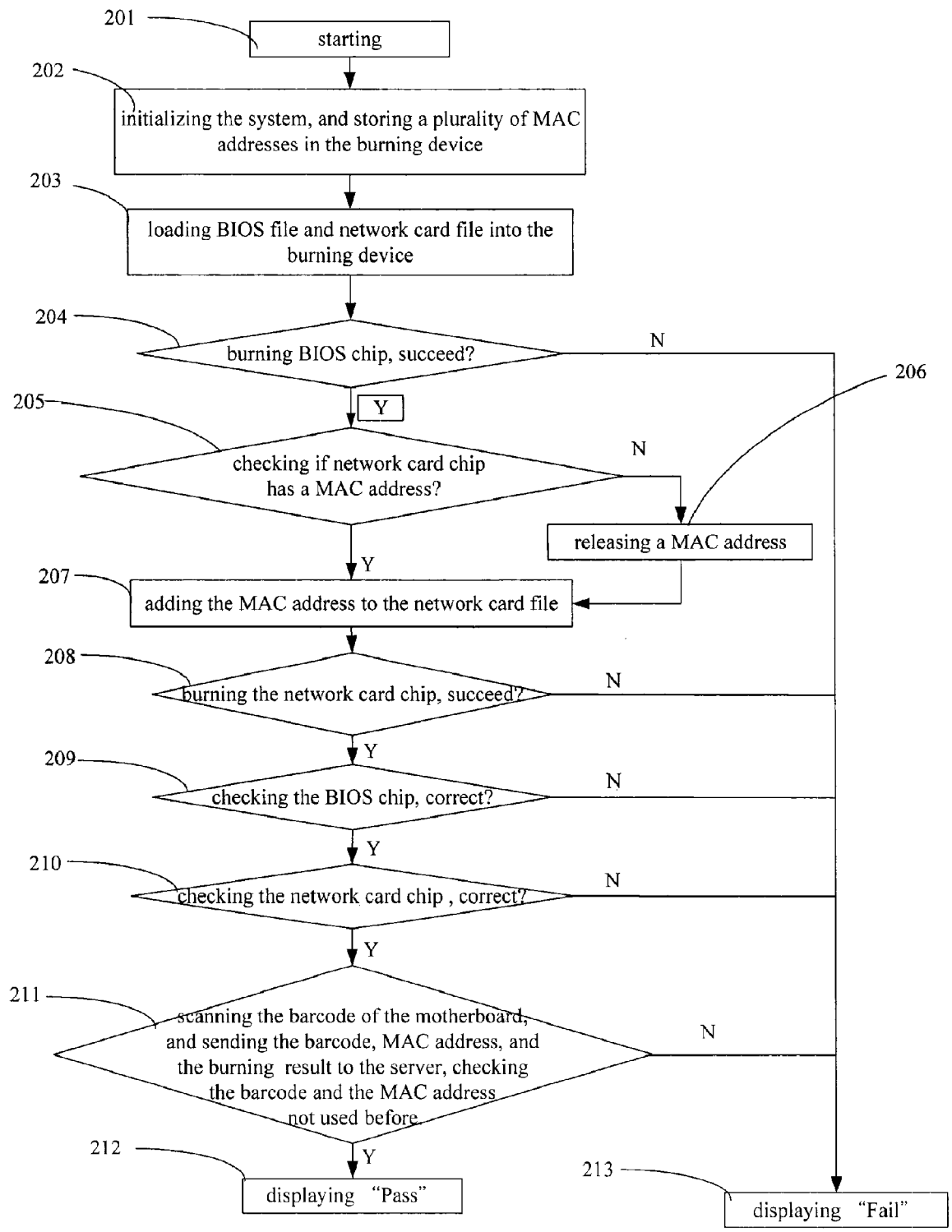
FIG. 2 is a flow chart showing the operation procedure using the system of FIG. 1.
Figure 3:
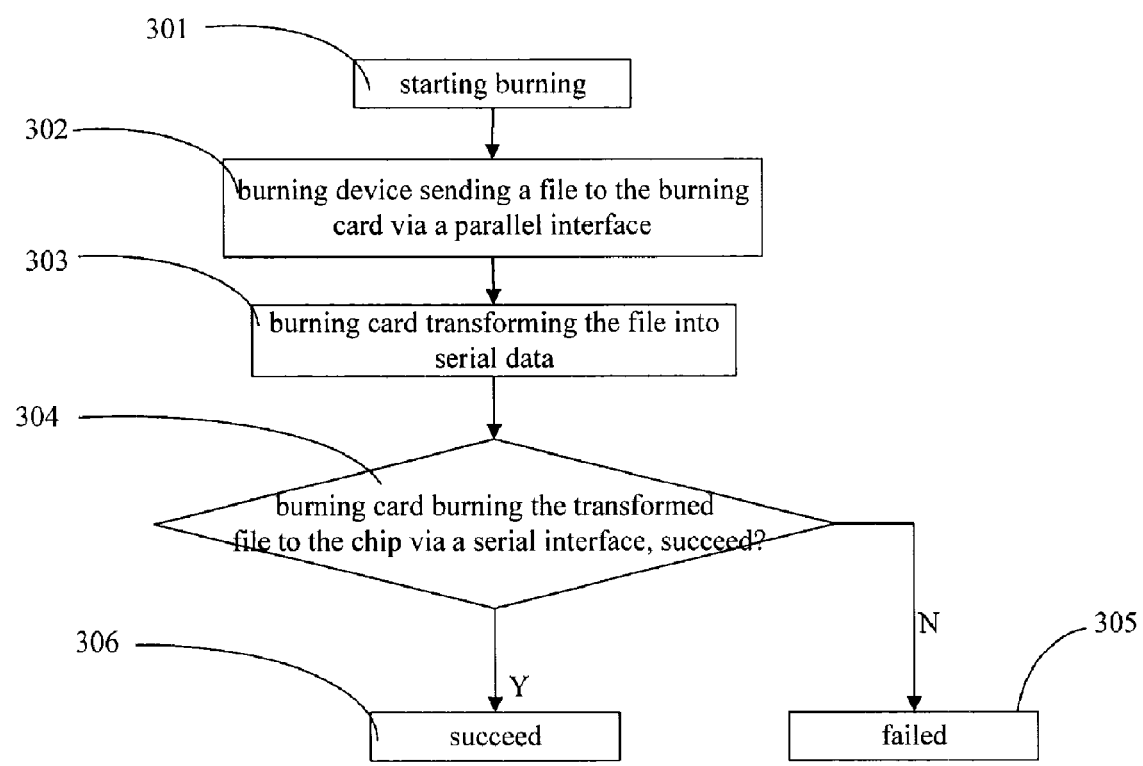
FIG. 3 is a flow chart showing details of a burning process of FIG. 2.
Figure 4:
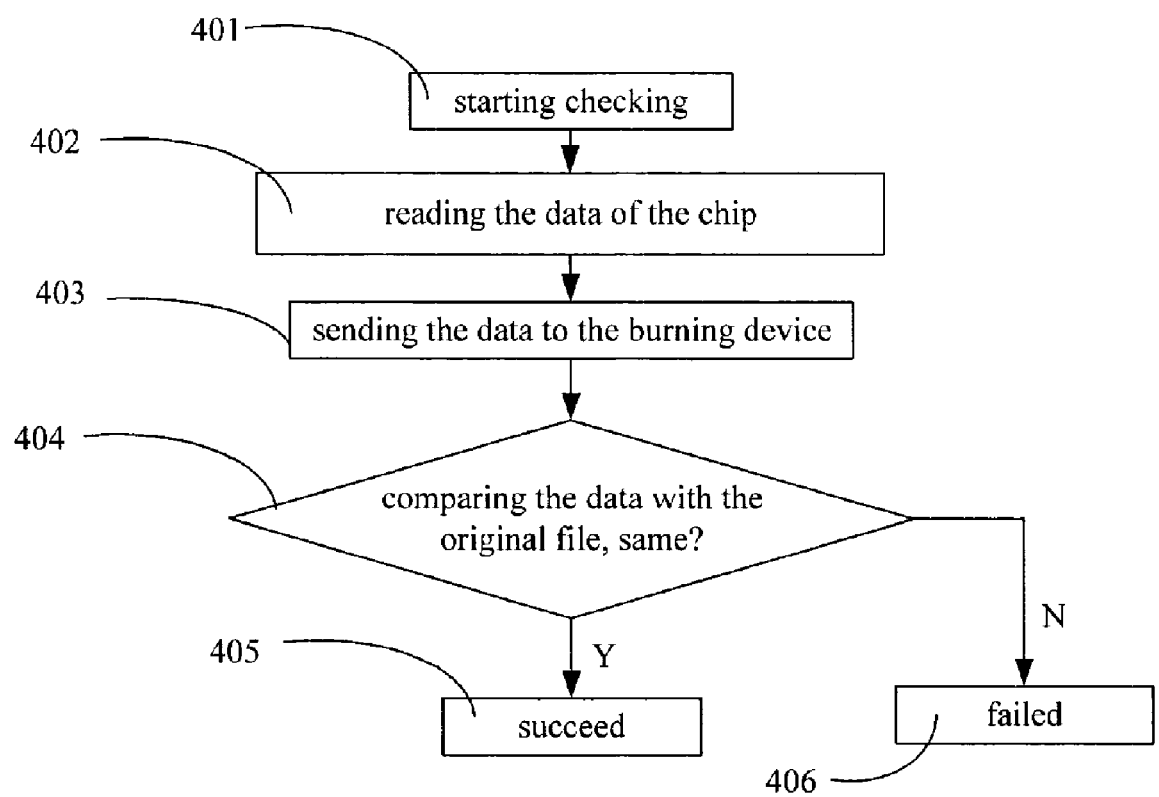
FIG. 4 is a flow chart showing details of a checking process of FIG. 2.

A method for burning the BIOS chip 108 and the network card chip 107 is shown by a main process of FIG. 2 and two detailed processes of FIG. 3 and FIG. 4. Referring to FIG. 2, the main process starts from step 201. The chip burning system is initialized. A plurality of MAC addresses is stored in the burning device 102 (step 202). A BIOS file and a network card file are loaded into the burning device 102 (step 203). The burning device 102 burns the BIOS file into the BIOS chip 108, and checks whether the burn is successful (step 204). If the burn is unsuccessful, the burning device 102 displays "Fail" (step 213).

If the burn is successful, the burning device 102 checks whether there is a Media Access Control (MAC) address in the network card chip 107 (step 205). If there is no a MAC address in the network card chip 107, the burning device 102 releases a MAC address (step 206), and adds the MAC address to the network card file (step 207).

Following step 205, if there is a MAC address in the network card chip 107, the burning device 102 adds the existing MAC address to the network card file (step 207). Then, the burning device 102 burns the network card file into the network card chip 107, and checks whether the burn is successful (step 208). If the burn is unsuccessful, the burning device 102 displays "Fail" (step 213).

Following step 208, if the burn is successful, the burning device 102 checks whether the BIOS chip 108 is burned correctly (step 209). If the BIOS chip 108 is burned incorrectly, the burning device 102 displays "Fail" (step 213).

Following step 209, if the BIOS chip 108 is burned correctly, the burning device 102 checks whether the network card chip 107 is burned correctly (step 210). If the network card chip 107 is burned incorrectly, the burning device 102 displays "Fail" (step 213).

Following step 210, if the network card chip 107 is burned correctly, the burning device 102 scans the barcode of the motherboard 106. The burning device 102 sends the barcode, the MAC address, and the burn result to the server 100. The server 100 recodes the barcode and the MAC address, and checks whether the MAC address has been used in another motherboard (step 211). If the MAC address has been used in another motherboard, the burning device 102 displays "Fail" (step 213). If not, the burning device 102 displays "Pass" (step 212).

Referring to FIG. 3, what is shown are the details of the steps 204, 208 in FIG. 2 for burning the chips. The burning process starts from step 301. The burning device 102 sends the file (BIOS file or network card file) to the burning card 104 via a parallel interface (step 302). Because communication between the burning card 104 and the burning device 102 is via a parallel interface, the communication between the two devices is quick, and the time required for burning is reduced.

The burning card 104 transforms the file into serial data (step 303). The burning card 104 then burns the transformed file to the chip via a serial interface, and checks if the burning process is successful (step 304). If the burning process is successful, then step 306 is next, if not, then step 305 is next.

Referring to FIG. 4, what is shown are the details of the steps 209, 210 in FIG. 2 for checking the chips. The checking process starts from step 401. The data in the chip is read by the burning card 104 (step 402). The burning card 104 sends the data from the chip to the burning device 102 (step 403). The burning device 102 compares the data with the original file to make sure the data in the chip is correct (step 404). If the data is correct, the chip is burned correctly (step 405). If the data is not correct, the chip is burned wrong (step 406).

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for burning a BIOS chip and a network card chip that are attached on a motherboard, comprising the steps in the following order:
    storing a plurality of MAC addresses in a burning device;
    loading a BIOS file and a network card file into the burning device;
    sending the BIOS file from the burning device to a burning card, and burning the BIOS file into the BIOS chip via the burning card;
    sending the network card file which includes a MAC address front the burning device to the burning card, and burning the network cand file Into the network card chip via the burning card; and
    verifying whether the BIOS chip and the network card chip have been burned correctly.

2. The method as described in claim 1, wherein each of the steps of the burning the BIOS file into the BIOS chip via the burning card and the burning the network card file into the network card chip via the burning card comprises the steps of:
    sending the file from the burning device to the burning card via a parallel interface;
    transforming the file in the burning card into serial data; and
    burning the transformed file to the chip via a serial interface.

3. The method as described in claim 1, wherein the verifying step comprises the steps of:
    reading the data stored in the chip by the burning card;
    sending the data from the burning card to the burning device; and
    comparing the data with the original file by the burning device.

4. The method as described in claim 1, wherein after the chip is verified to be correctly burned, the burning device scans a barcode of the motherboard, and sends the barcode and the MAC address in the corresponding chip to a server.

5. The method as described in claim 4, wherein the server recodes the barcode and the MAC address, and compares them with the recoded barcodes and MAC addresses in the server to avoid the same MAC address being used in more than one motherboard.

6. The method as described in claim 1, wherein before the burning device sends the network card file to the burning card, the burning device checks if the network card chip already contains a MAC address, if yes, the MAC address is added to the network card, if not, the burning device releases a MAC address, and adds it to the network card file.

* * * * *

UNITED STATES PATENT AND TRADEMARK OFFICE
CERTIFICATE OF CORRECTION

PATENT NO. : 7,613,916 B2  Page 1 of 1
APPLICATION NO. : 11/306524
DATED : November 3, 2009
INVENTOR(S) : Li et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 868 days.

Signed and Sealed this

Nineteenth Day of October, 2010

David J. Kappos
*Director of the United States Patent and Trademark Office*